United States Patent
Mohlin et al.

(10) Patent No.: US 12,397,613 B2
(45) Date of Patent: Aug. 26, 2025

(54) COOLING SYSTEM AND VEHICLE COMPRISING SUCH A COOLING SYSTEM

(71) Applicant: Scania CV AB, Södertälje (SE)

(72) Inventors: Martin Mohlin, Stockholm (SE); Ola Hall, Stockholm (SE); Björn Kylefors, Nykvarn (SE); Zoltan Kardos, Södertälje (SE)

(73) Assignee: Scania CV AB, Södertälje (SE)

( * ) Notice: Subject to any disclaimer, the term of this patent is extended or adjusted under 35 U.S.C. 154(b) by 252 days.

(21) Appl. No.: 17/918,434

(22) PCT Filed: May 6, 2021

(86) PCT No.: PCT/SE2021/050421
§ 371 (c)(1),
(2) Date: Oct. 12, 2022

(87) PCT Pub. No.: WO2021/235991
PCT Pub. Date: Nov. 25, 2021

(65) Prior Publication Data
US 2023/0145211 A1 May 11, 2023

(30) Foreign Application Priority Data
May 19, 2020 (SE) .................................. 2050584-8

(51) Int. Cl.
*B60H 1/00* (2006.01)
*B60K 11/04* (2006.01)

(52) U.S. Cl.
CPC .......... *B60H 1/00571* (2013.01); *B60K 11/04* (2013.01)

(58) Field of Classification Search
CPC ..................................................... F01P 11/028
See application file for complete search history.

(56) References Cited

U.S. PATENT DOCUMENTS

| 2,200,620 A | 5/1940 | Findley |
| 2,231,501 A | 2/1941 | Jepertinger |
| (Continued) | | |

FOREIGN PATENT DOCUMENTS

| CN | 101245962 A | 8/2008 |
| CN | 101622430 A | 1/2010 |
| (Continued) | | |

OTHER PUBLICATIONS

Scania CV AB, International Patent Application No. PCT/SE2021/050421, International Search Report, Jun. 2, 2021.
(Continued)

*Primary Examiner* — Ana M Vazquez
(74) *Attorney, Agent, or Firm* — Moore & Van Allen PLLC; W. Kevin Ransom

(57) ABSTRACT

A cooling system is disclosed having a cooling circuit with a deaeration device arranged in the cooling circuit for separation of air bubbles from coolant circulating in the coolant circuit. The deaeration device includes a deaeration chamber having a coolant inlet connected to a feed pipe of the cooling circuit, a first coolant outlet connected to a coolant pump of the cooling circuit, and a second coolant outlet connected to an expansion tank via a static line. The deaeration chamber has a larger cross-sectional dimension than the feed pipe. The second coolant outlet is located in a position in relation to the coolant inlet and the first coolant outlet such that the coolant flow in the deaeration chamber between the coolant inlet and the first coolant outlet will move migrating air bubbles in the longitudinal direction of the deaeration chamber towards the second coolant outlet.

16 Claims, 3 Drawing Sheets

(56) References Cited

U.S. PATENT DOCUMENTS

| | | | | |
|---|---|---|---|---|
| 5,507,858 | A | * | 4/1996 | Jepson ............... B01D 19/0042 |
| | | | | 96/206 |
| 7,395,787 | B1 | * | 7/2008 | Claypole .................. F01P 11/04 |
| | | | | 123/41.31 |
| 8,128,741 | B2 | * | 3/2012 | Maeda .................... B01F 25/25 |
| | | | | 210/150 |
| 2007/0101953 | A1 | | 5/2007 | Gunther |
| 2009/0280395 | A1 | | 11/2009 | Nemesh et al. |
| 2010/0031901 | A1 | | 2/2010 | Dahl et al. |
| 2011/0107983 | A1 | | 5/2011 | Magro |
| 2019/0120120 | A1 | | 4/2019 | Quevallier et al. |

FOREIGN PATENT DOCUMENTS

| | | | | |
|---|---|---|---|---|
| CN | 102022172 | A | | 4/2011 |
| DE | 102006051770 | B4 | | 5/2012 |
| DE | 102011118837 | A1 | | 5/2013 |
| EP | 3012429 | A1 | | 4/2016 |
| EP | 3301274 | A1 | * | 4/2018 ............ F01P 11/028 |
| FR | 2312645 | A1 | | 12/1976 |
| FR | 2905737 | A1 | * | 3/2008 ............ F01P 11/028 |
| KR | 2017025157 | A | * | 3/2017 ............ B60W 10/30 |
| WO | 2014016554 | A1 | | 1/2014 |

OTHER PUBLICATIONS

Scania CV AB, International Patent Application No. PCT/SE2021/050421, Written Opinion, Jun. 2, 2021.
Scania CV AB, Swedish Patent Application No. 2050584-8, Office Action, Jan. 29, 2021.
Scania CV AB, Swedish Patent Application No. 2050584-8, Office Action, Jun. 3, 2021.
Scania CV AB, International Patent Application No. PCT/SE2021/050421, International Preliminary Report on Patentability, Nov. 17, 2022.
Scania CV AB, Korean Patent Application No. 10-2022-7035702, Office Action, Nov. 2, 2023.
Scania CV AB, European Patent Application No. 21809120.5, Extended European Search Report, Jun. 7, 2024.
Scania CV AB, Chinese Patent Application No. 202180033785.0, First Office Action, Feb. 14, 2025.

* cited by examiner

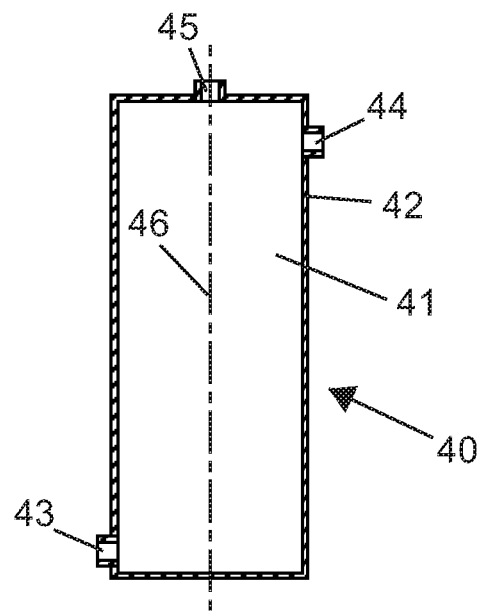
Fig 5
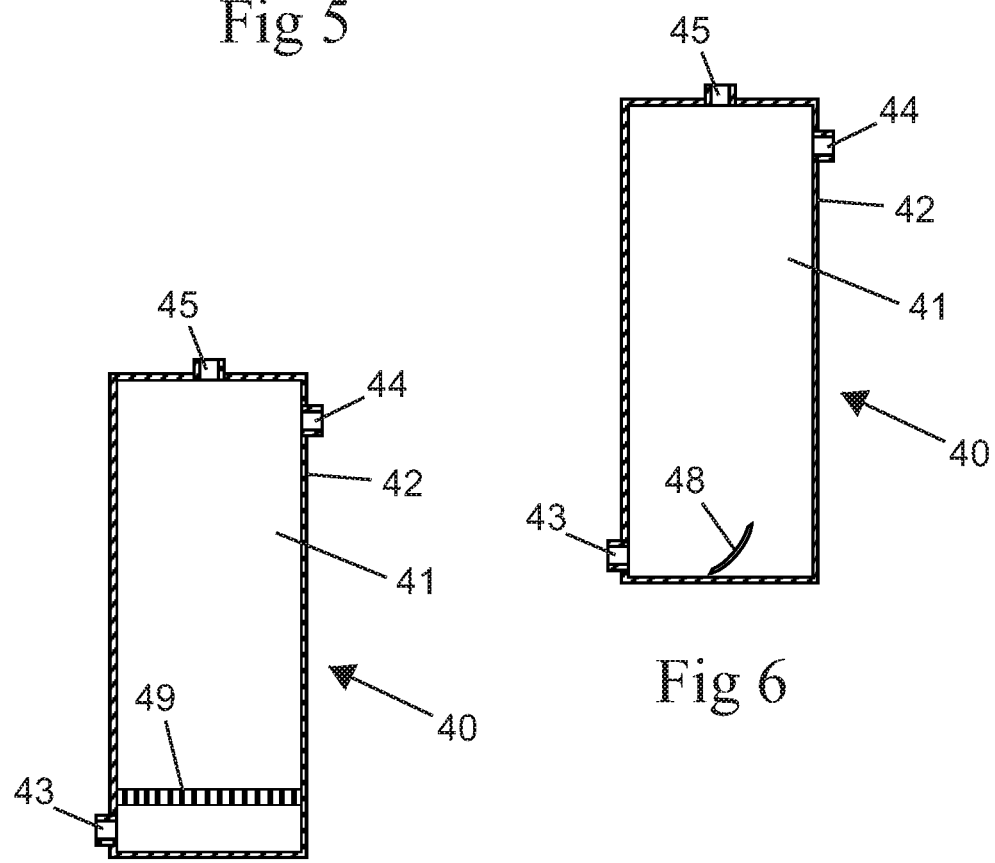
Fig 6
Fig 7

COOLING SYSTEM AND VEHICLE COMPRISING SUCH A COOLING SYSTEM

CROSS-REFERENCE TO RELATED APPLICATIONS

This application is a National Stage Patent Application (filed under 35 § U.S.C. 371) of PCT/SE2021/050421, filed May 6, 2021, of the same title, which, in turn claims priority to Swedish Patent Application No. 2050584-8 filed May 19, 2020, of the same title; the contents of each of which are hereby incorporated by reference.

FIELD OF THE INVENTION

The present invention relates to a cooling system with capability to facilitate migration of air bubbles in the coolant of the cooling system towards a coolant outlet.

BACKGROUND OF THE INVENTION

Some of the vehicle components included in a motor vehicle may be cooled by means of coolant circulating in cooling circuit of a cooling system. Absorbed heat may be emitted from the circulating coolant to the surroundings via a radiator which is provided in the cooling circuit and arranged at the front end of the vehicle, wherein coolant flowing through the radiator is cooled by means of ambient air which is blown towards the radiator when the vehicle is in motion.

When a vehicle component is cooled by coolant circulating in a cooling circuit, the vehicle component will give off heat to the coolant, which is thereby heated and expanded. The resulting total volume increase of the coolant in the cooling circuit depends on the original coolant volume and the temperature increase. In order to prevent the pressure from increasing too much in the cooling circuit, the cooling circuit is provided with an expansion tank which can accommodate the surplus coolant volume generated in connection with the expansion of the coolant. Another important function of a conventional expansion tank in a cooling system of the above-mentioned type is that it should be possible for the coolant received in the expansion tank to be deaerated in the expansion tank before leaving the expansion tank. In a conventional cooling system of the type where a cooling circuit is connected to an expansion tank in a motor vehicle, there is a small continuous flow of coolant from the cooling circuit to the expansion tank via one or more deaeration lines and from the expansion tank back to the cooling circuit via a so-called static line. The air which accompanies the coolant to the expansion tank is intended to rise to the surface of the coolant volume received in the expansion tank in order to accumulate in an air-filled space at an upper part of the expansion tank. Hereby, the coolant in the expansion tank is deaerated. As an alternative, the cooling system may comprise a separate deaeration device which is arranged in the cooling circuit for separation of air bubbles from the coolant circulating in the cooling circuit, wherein the deaeration device is connected to the expansion tank via a static line in order to allow air bubbles separated from the coolant in the deaeration device to migrate upwards in the static line to the expansion tank. A cooling system of the latter type is for instance previously known from U.S. Pat. No. 7,395,787 B1.

By using a deaeration device of the type disclosed in U.S. Pat. No. 7,395,787 B1, it will be possible to achieve deaeration of the coolant in a cooling circuit without requiring any flow of coolant from the cooling circuit to the expansion tank connected to the cooling circuit, which in its turn implies that it will be possible to dispense with conventional deaeration lines for feeding of coolant from the cooling circuit to the expansion tank. Such deaeration lines may be rather costly and may also take up a lot of space, and it is consequently of advantage to be able to dispense with the deaeration lines.

The deaeration device included in the cooling system disclosed in U.S. Pat. No. 7,395,787 B1 comprises a deaeration chamber which at its top is provided with an outlet connected to an expansion tank via a static line. The deaeration chamber has a cross-sectional dimension that is substantially larger than the cross-sectional dimension of the coolant feed pipes leading to the deaeration chamber so that the coolant flow is slowed down and given an increased dwell time in the deaeration chamber, which in its turn will give air bubbles in the coolant a chance to migrate in the deaeration chamber to the outlet at the top of the deaeration chamber and then further on to the expansion tank via the static line.

SUMMARY OF THE INVENTION

The object of the present invention is to achieve a further development of a cooling system of the above-mentioned type so as to provide a cooling system that is improved in at least some aspect.

According to the present invention, the above-mentioned object is achieved by means of a cooling system having the features defined in the claims.

The cooling system of the present invention comprises:
a cooling circuit;
a coolant pump for circulating coolant in the cooling circuit;
an expansion tank for accumulation of coolant; and
a deaeration device arranged in the cooling circuit for separation of air bubbles from the coolant circulating in the cooling circuit, wherein the deaeration device is connected to the expansion tank via a static line and comprises a deaeration chamber having:
a coolant inlet connected to a feed pipe of the cooling circuit in order to allow coolant circulating in the cooling circuit to flow from the feed pipe into the deaeration chamber via this coolant inlet,
a first coolant outlet connected to the coolant pump in order to allow coolant to flow from the deaeration chamber to the coolant pump via this first coolant outlet, wherein the coolant inlet and the first coolant outlet are spaced apart from each other in a longitudinal direction of the deaeration chamber, and
a second coolant outlet connected to the expansion tank via the static line and located at a higher position than the first coolant outlet relative to a local gravity vector gv when the cooling system is mounted to a vehicle and the vehicle is positioned in an upright use position on a horizontal surface.

The cross-sectional dimension of the deaeration chamber is larger than the cross-sectional dimension of the feed pipe to thereby allow air bubbles carried along with coolant flowing through the feed pipe to enter the deaeration chamber via the coolant inlet and thereafter migrate in the deaeration chamber to the second coolant outlet.

According to the invention, the above-mentioned second coolant outlet, i.e. the coolant outlet connected to the expansion tank via the static line, is located in such a position in relation to the coolant inlet and the first coolant outlet that the coolant flow in the deaeration chamber between the coolant inlet and the first coolant outlet will move said migrating air bubbles in the longitudinal direction of the deaeration chamber towards the second coolant outlet. Furthermore, the first coolant outlet is arranged at a higher position than the coolant inlet relative to a local gravity vector gv when the cooling system is mounted to a vehicle and the vehicle is positioned in an upright use position on a horizontal surface.

Hereby, the air bubbles migrating in the deaeration chamber towards the second coolant outlet do not have to move against the flow direction of the coolant in the deaeration chamber and the coolant flow in the deaeration chamber will consequently not counteract the migration of the air bubbles towards the second coolant outlet. On the contrary, the coolant flow in the deaeration chamber will promote the migration of air bubbles in the deaeration chamber towards the second coolant outlet and an efficient separation of air bubbles from the circulating coolant may thereby be achieved in the deaeration chamber. It has turned out that an efficient separation of air bubbles can be achieved with a higher flow velocity for the coolant in the deaeration chamber when the coolant flow in the deaeration chamber is directed in the intended migration direction for the air bubbles as compared to the case when the coolant flow in the deaeration chamber is directed opposite to the intended migration direction for the air bubbles. It has also turned out that a smaller difference in the cross-sectional dimension between the deaeration chamber and the coolant feed pipe leading to the deaeration chamber is required when the coolant flow in the deaeration chamber is directed in the intended migration direction for the air bubbles as compared to the case when the coolant flow in the deaeration chamber is directed opposite to the intended migration direction for the air bubbles, which in its turn implies that it will be possible to reduce the cross-sectional dimension of the deaeration chamber. A reduction of the difference in the cross-sectional dimension between the deaeration chamber and the coolant feed pipe leading to the deaeration chamber will also result in a favorable reduction of the pressure drop across the deaeration chamber. The deaeration device is to be located at a lower position than the expansion tank in order to allow air bubbles separated from the coolant in the deaeration device to migrate upwards in the static line towards the expansion tank.

In addition, by arranging the first coolant outlet at a higher position than the coolant inlet relative to a local gravity vector gv when the cooling system is mounted to a vehicle and the vehicle is positioned in an upright use position on a horizontal surface, the coolant flow will have a flow component directed upwards, i.e. a flow component which is parallel and oppositely directed to the local gravity vector gv. Thus, the coolant flow in the deaeration chamber will act on the air bubbles with a force which has a vector component which is parallel and oppositely directed to the local gravity vector gv. The air bubbles will therefore be pushed upwards, towards the second outlet and the static line. This will improve the separation of the air bubbles from the coolant and the evacuation of the air bubbles to the expansion chamber. The effect is especially pronounced for small air bubbles, having low terminal velocity. Thereby an efficient deaeration can be performed.

With the above-mentioned deaeration device, the coolant in the cooling circuit may be deaerated in a simple and efficient manner with the use of a component of simple construction which can be produced at low cost.

The cross-sectional dimension of the deaeration chamber is preferably so much larger than the cross-sectional dimension of the feed pipe that the relationship between the flow velocity of the coolant flowing through the deaeration chamber between the coolant inlet and the first coolant outlet and the flow velocity of the coolant flowing through the feed pipe is 1:2 or lower, preferably 1:3 or lower. Hereby, it will be possible, by a suitable control of the coolant pump, to adapt the coolant flow through the cooling circuit in such a manner that the flow velocity of the coolant in the feed pipe is sufficiently high to allow this coolant to move air bubbles forward along the feed pipe and into the deaeration chamber at the same time as the flow velocity of the coolant in the deaeration chamber is sufficiently low to allow said air bubbles to migrate in the deaeration chamber to the second coolant outlet of the deaeration chamber. If the flow velocity of the coolant is too low in the feed pipe, air bubbles may get stuck in the feed pipe. If the flow velocity of the coolant is too high in the deaeration chamber, the coolant may carry along air bubbles out of the deaeration chamber via the first coolant outlet. The coolant pump may be controlled in such a manner that the coolant circulating in the cooling circuit is continuously deaerated. However, the coolant pump may as an alternative be configured to adapt the coolant flow in the cooling circuit in such a manner that deaeration is effected intermittently or only at specific occasions.

According to an embodiment of the invention, the deaeration chamber has an elongated shape and is arranged with its longitudinal axis vertical, wherein the coolant inlet is located at a lower position than the first and second coolant outlets. A deaeration device with such a deaeration chamber has a rather simple construction and can be produced in a simple and cost-efficient manner.

According to another embodiment of the invention, the deaeration chamber has an elongated shape and is arranged with its longitudinal axis inclined in relation to a horizontal plane by an angle of 0-90, preferably by an angle which is >0° and <=90°, more preferably by an angle of 10-90°, most preferably 15-90°. By horizontal plane is herein meant the plane whose normal is parallel to the prevailing gravitational vector. When the deaeration chamber is arranged with its longitudinal axis inclined at an angle greater than 0° in relation to the horizontal plane, air bubbles may rise in the deaeration chamber and hit an inclined upper wall surface in the deaeration chamber, whereupon the air bubbles are conveyed along this wall surface towards the second coolant outlet under the effect of the coolant flow in the deaeration chamber between the coolant inlet and the first coolant outlet Additionally, even at very low flow, air bubbles which have separated from the coolant will rise towards the static line due to the buoyancy of the air bubbles. Thus, an improved deaeration will be achieved. By having the inclination between 10-90° the chamber will, in most cases, be inclined towards the horizontal plane even if the vehicle is travelling on a downwards slope. Thereby the above described effect is still maintained even if the vehicle is moving in hilly terrain. By having the inclination between 15-90° it is ensured that the chamber will be inclined in relation to the horizontal plane for a great majority of a standard trip. This ensures that the deaeration of the cooling system is functioning optimally at practically all times, thereby minimizing the risk of detrimental effects due to air bubbles in the system. The inclination may also be 10-80° or 15-75° so as to take both upwards and downwards slope into consideration.

According to another embodiment of the invention, one or more flow guiding members are arranged in the deaeration chamber downstream of the coolant inlet and configured to direct the coolant entering the deaeration chamber via the coolant inlet essentially in parallel with the longitudinal axis of the deaeration chamber. The flow guiding members will direct the coolant flow in the intended migration direction for the air bubbles in the deaeration chamber, which promotes an efficient separation of air bubbles in the deaeration chamber.

According to another embodiment of the invention, the deaeration chamber comprises at least one further coolant inlet connected to an associated further feed pipe of the cooling circuit in order to allow coolant circulating in the cooling circuit to flow from this further feed pipe into the deaeration chamber via the associated further coolant inlet. The cross-sectional dimension of the deaeration chamber is preferably larger than the cross-sectional dimension of said further feed pipe to thereby allow air bubbles carried along with coolant flowing through this further feed pipe to enter the deaeration chamber via the associated further coolant inlet and thereafter migrate in the deaeration chamber to the second coolant outlet, wherein this further coolant inlet is located in such a position in relation to the first and second coolant outlets that the coolant flow in the deaeration chamber between this further coolant inlet and the first coolant outlet will move these migrating air bubbles in the longitudinal direction of the deaeration chamber towards the second coolant outlet. Hereby, also air bubbles conveyed into the deaeration chamber together with coolant from the further feed pipe may be efficiently separated from the coolant in the deaeration chamber.

The first coolant outlet may be arranged at a higher position than the further coolant inlet relative to a local gravity vector gv when the cooling system is mounted to a vehicle and the vehicle is positioned in an upright use position on a horizontal surface. The advantages associated with such a configuration has already been discussed above with regards to the coolant inlet and the first coolant outlet and will therefore for the sake of brevity not be reproduced here.

Another embodiment of the invention is characterized in:
that said cooling circuit and coolant pump constitute a first cooling circuit and a first coolant pump of the cooling system, wherein the cooling system comprises a second cooling circuit and a second coolant pump for circulating coolant in the second cooling circuit; and
that the deaeration chamber is provided with:
a further coolant inlet connected to a feed pipe of the second cooling circuit in order to allow coolant circulating in the second cooling circuit to flow from this feed pipe into the deaeration chamber via this further coolant inlet, and
a further coolant outlet connected to the second coolant pump in order to allow coolant to flow from the deaeration chamber to the second coolant pump via this further coolant outlet.

In this case, the deaeration chamber may be used for separating air bubbles from coolant circulating in two different cooling circuits.

According to another embodiment of the invention, the cross-sectional dimension of the deaeration chamber is larger than the cross-sectional dimension of said feed pipe of the second cooling circuit to thereby allow air bubbles carried along with coolant flowing through this feed pipe to enter the deaeration chamber via the associated further coolant inlet and thereafter migrate in the deaeration chamber to the second coolant outlet, wherein this further coolant inlet is located in such a position in relation to the second coolant outlet and said further coolant outlet that the coolant flow in the deaeration chamber between this further coolant inlet and this further coolant outlet will move these migrating air bubbles in the longitudinal direction of the deaeration chamber towards the second coolant outlet. Hereby, also air bubbles conveyed into the deaeration chamber together with coolant from the feed pipe of the second cooling circuit may be efficiently separated from the coolant in the deaeration chamber. The number of cooling circuits connected to the deaeration chamber of the deaeration device may also be three or more.

The second coolant outlet may be arranged at a higher position than the further coolant inlet relative to a local gravity vector gv when the cooling system is mounted to a vehicle and the vehicle is positioned in an upright use position on a horizontal surface. The advantages associated with such a configuration has already been discussed above with regards to the coolant inlet and the first coolant outlet and will therefore for the sake of brevity not be reproduced here.

According to another embodiment of the invention, the static line has a lower end and an upper end, wherein the static line is connected to the deaeration device at its lower end and wherein:
the static line slopes upwards along its entire length from its lower end to its upper end, or
the static line is formed by several interconnected length sections which are arranged in series with each other and which consist of one or more first length sections, each of which sloping upwards as seen in a direction along the static line from its lower end towards its upper end, and one or more horizontal second length sections.

Hereby, the static line lacks downwardly sloping sections that could prevent air bubbles from migrating from the deaeration device towards the expansion tank.

Further advantageous features of the cooling system according to the present invention will appear from the description following below.

The invention also relates to a vehicle having the features defined in claim 12.

Further advantageous features of the vehicle according to the present invention will appear from the description following below.

BRIEF DESCRIPTION OF THE DRAWINGS

With reference to the appended drawings, a specific description of embodiments of the invention cited as examples follows below. In the drawings:

FIG. 5 is a schematic vertical section through a deaeration device included in the cooling system of FIG. 1, FIG. 6 is a schematic vertical section through a deaeration device according to an alternative variant, and FIG. 7 is a schematic vertical section through a deaeration device according to another variant.

DETAILED DESCRIPTION OF EMBODIMENTS OF THE INVENTION

Figure 1:
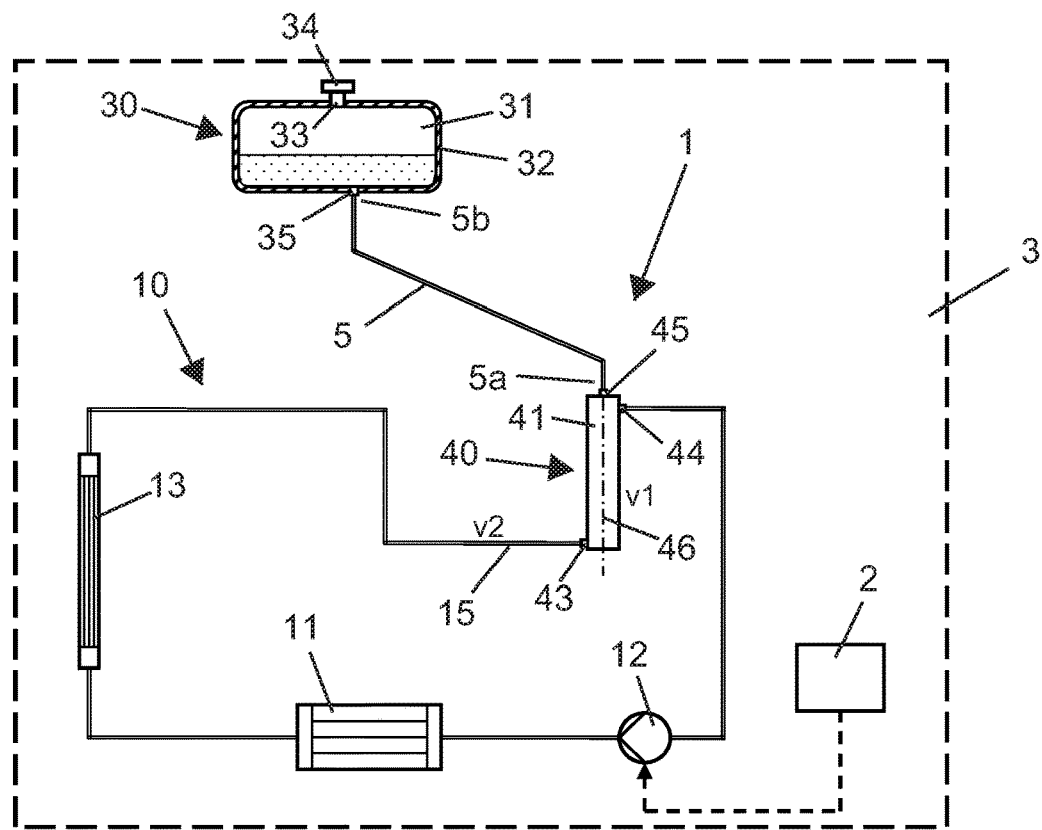
FIG. 1 is an outline diagram of a cooling system according to a first embodiment of the present invention.

A cooling system 1 according to an embodiment of the present invention is very schematically illustrated in FIG. 1.

The cooling system 1 comprises a cooling circuit 10 for cooling at least one component 11 by means of coolant circulating in the cooling circuit. The coolant flowing through the cooling circuit 10 is preferably water, possibly with anti-freezing additives such as for instance glycol. A coolant pump 12, preferably in the form of an electrically driven pump, is provided in the cooling circuit 10 in order to circulate the coolant in the cooling circuit. The cooling system 1 may further comprise an electronic control unit 2 which is connected to the coolant pump 12 and configured to control the operation thereof so as to thereby control the flow velocity of the coolant circulating in the cooling circuit 10.

Furthermore, a cooling device 13, for instance in the form of a heat exchanger, is provided in the cooling circuit 10 in order to remove heat from the coolant circulating therein. The cooling system 1 may for instance be used in a motor vehicle 3, for instance in the form of a hybrid or fully electric vehicle, wherein the cooling device 13 may have the form of a radiator, for instance a conventional coolant radiator. In this case, the cooling circuit 10 may be a cooling circuit for cooling a vehicle component 11 in the form of an electric energy storing device, such as for instance an electric battery or a set of electric batteries, for supplying electric energy to an electric traction motor of the vehicle, or a cooling circuit for cooling vehicle components in the form of power electronic devices, such as for instance an inverter and a DC converter, for controlling the flow of electric power between an electric energy storing device of the above-mentioned type and the electric traction motor. The coolant flowing through the radiator 13 is cooled by means of ambient air which is blown towards the radiator when the vehicle 3 is in motion. The vehicle 3 may also be provided with a fan (not shown), which, when so needed, may be operated in order to generate an air flow through the radiator 13.

The cooling system 1 comprises an expansion tank 30 provided with an expansion chamber 31 for accumulation of coolant, wherein this expansion chamber 31 is surrounded by an external casing 32 of the expansion tank. The expansion tank 30 is provided with a closable refill opening 33 which is arranged in the casing 32 at an upper part thereof. Coolant may be introduced into the expansion chamber 31 via this refill opening 33 in order to provide for replenishment of the cooling system. The refill opening 33 is closed by means of a removable lid 34. Furthermore, the expansion tank 31 is provided with a valve device (not shown) which comprises a pressure relief valve for limiting the pressure in the expansion chamber 31 and a return valve. This valve device may be arranged in the lid 34 or in the casing 32. The pressure relief valve allows air and coolant to flow out from the upper part of the expansion chamber 31 when the pressure in the expansion chamber, due to an increase of the coolant volume, exceeds a pressure level given by the pressure relief valve. Thus, the pressure relief valve ensures that the pressure in the expansion chamber 31 cannot exceed a predetermined pressure level. The return valve allows air to flow into the upper part of the expansion chamber 31 from the surroundings when the pressure in the expansion chamber, due to a reduction of the coolant volume, becomes lower than a pressure level given by the return valve.

The expansion chamber 31 is connected to the cooling circuit 10 via a static line 5 in order to allow the expansion chamber 31 to receive coolant from the cooling circuit 10.

The cooling system 1 comprises a deaeration device 40 arranged in the cooling circuit 10 for separation of air bubbles from the coolant circulating in the cooling circuit, wherein this deaeration device 40 is located at a lower position than the expansion tank 30 and connected to the expansion chamber 31 of the expansion tank 30 via the static line 5 in order to allow air bubbles separated from the coolant in the deaeration device 40 to migrate upwards in the static line 5 towards the expansion chamber 31. In the embodiment illustrated in FIG. 1, the static line 5 is connected directly to the expansion chamber 31 via an opening 35 provided in the casing 32 of the expansion tank.

Figure 2:
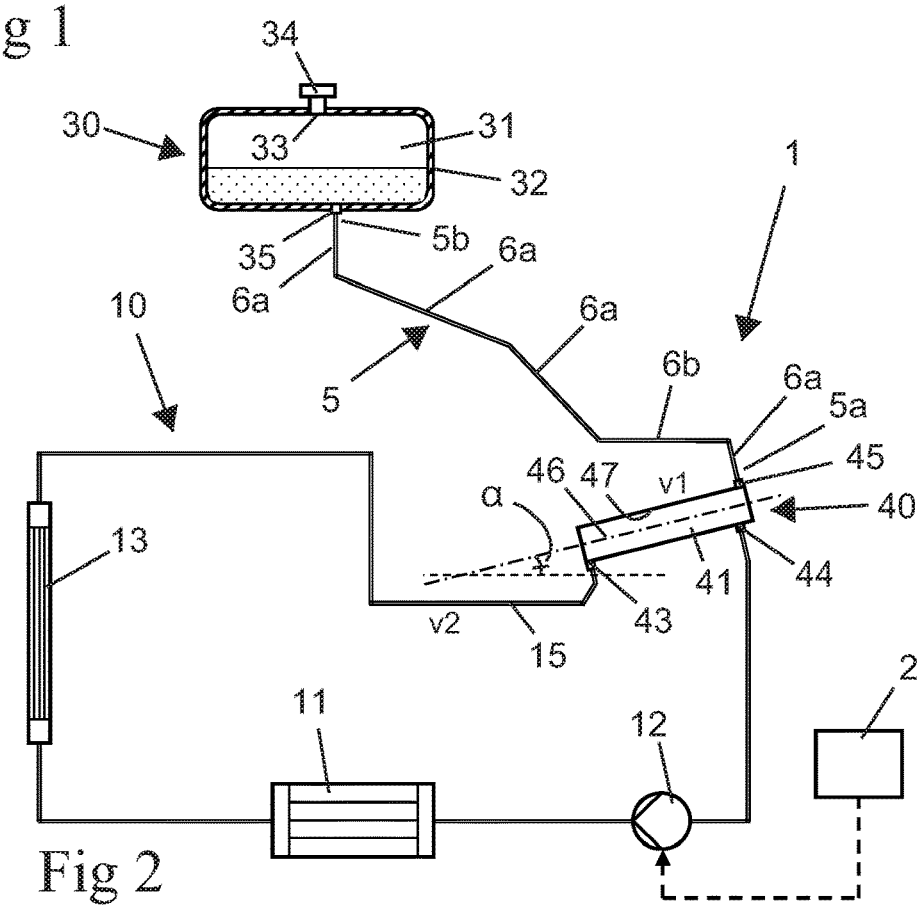
FIG. 2 is an outline diagram of a cooling system according to a second embodiment of the invention.

The static line 5 has a lower end 5a and an upper end 5b, wherein the static line 5 is connected to the deaeration device 40 at its lower end 5a. In the embodiment illustrated in FIG. 1, the static line 5 slopes upwards along its entire length from its lower end 5a to its upper end 5b. However, as illustrated in FIG. 2, the static line 5 may as an alternative consist of a combination of one or more first length sections 6a, each of which sloping upwards as seen in a direction along the static line from its lower end towards its upper end, and one or more horizontal second length sections 6b, wherein these first and second length sections 6a, 6b are interconnected and arranged in series with each other.

The deaeration device 40 comprises a deaeration chamber 41 (see FIG. 5), which is enclosed by a casing 42 and which has:
- a coolant inlet 43 connected to a feed pipe 15 of the cooling circuit 10 in order to allow coolant circulating in the cooling circuit to flow from the feed pipe 15 into the deaeration chamber 41 via this coolant inlet 43;
- a first coolant outlet 44 connected to the coolant pump 12 in order to allow coolant to flow from the deaeration chamber 41 to the coolant pump 12 via this first coolant outlet 44, wherein the coolant inlet 43 and the first coolant outlet 44 are spaced apart from each other in a longitudinal direction of the deaeration chamber 41; and
- a second coolant outlet 45 connected to the expansion chamber 31 via the static line 5 and located at a higher position than the first coolant outlet 44 relative to a local gravity vector gv when the cooling system is mounted to a vehicle and the vehicle is positioned in an upright use position on a horizontal surface.

The second coolant outlet 45 is located in an upper part of the deaeration chamber 41 in order to allow air bubbles that have migrated to the upper part of the deaeration chamber to leave the deaeration chamber and enter the static line 5 via the second coolant outlet 45. Air bubbles may hereby be separated from the coolant in the cooling circuit 10. The second coolant outlet 45 is preferably located at the highest point in the deaeration chamber 41, but it may as an alternative be located slightly below the highest point in the deaeration chamber 41.

The cross-sectional dimension of the deaeration chamber 41 is larger than the cross-sectional dimension of the feed pipe 15 such that the flow velocity of the coolant in the deaeration chamber 41 is lower than the flow velocity of the coolant in the feed pipe 15 leading to the deaeration chamber, to thereby allow air bubbles to be carried along with the rather rapid coolant flow in the feed pipe 15 and enter the deaeration chamber 41 via the coolant inlet 43 and thereafter migrate in the deaeration chamber 41 to the second coolant outlet 45. The slower coolant flow in the deaeration chamber 41 will give the coolant an increased dwell time in the deaeration chamber, which in its turn will give air bubbles in the coolant a chance to migrate in the deaeration chamber 41 to the second coolant outlet 45.

The cross-sectional dimension of the deaeration chamber 41 is preferably so much larger than the cross-sectional dimension of the feed pipe 15 that the relationship between the flow velocity v1 of the coolant flowing through the deaeration chamber 41 between the coolant inlet 43 and the first coolant outlet 44 and the flow velocity v2 of the coolant flowing through the feed pipe 15 is 1:2 or lower, preferably 1:3 or lower.

The deaeration chamber 41 may have a cylindrical shape, for instance a circular cylindrical shape, but it may as an alternative have any other suitable shape.

The electronic control unit 2 may be configured to control the coolant pump 12 in such a manner that the flow velocity of the coolant circulating through the cooling circuit 10 is maintained at such a value during normal operating conditions that the coolant in the cooling circuit is continuously deaerated during the normal operating conditions. However, the electronic control unit 2 may as an alternative be configured to control the coolant pump 12 in such a manner that the flow velocity intermittently or only at specific occasions is set to a value adapted for an efficient deaeration of the coolant in the cooling circuit 10.

The second coolant outlet 45 is located in such a position in relation to the coolant inlet 43 and the first coolant outlet 44 that the coolant flow in the deaeration chamber 41 between the coolant inlet 43 and the first coolant outlet 44 will move migrating air bubbles in the deaeration chamber 41 in the longitudinal direction of the deaeration chamber 41 towards the second coolant outlet 45. Thus, the migration direction of the air bubbles in the deaeration chamber 41 corresponds to the flow direction of the coolant in the deaeration chamber and the coolant flow in the deaeration chamber 41 will thereby promote the movement of the air bubbles towards the second coolant outlet 45.

The first coolant outlet 44 is arranged at a higher position than the coolant inlet 43 relative to a local gravity vector gv when the cooling system is mounted to a vehicle and the vehicle is positioned in an upright use position on a horizontal surface. Thereby the coolant flow from the coolant inlet 43 will have a vector component which is opposite the local gravity vector gv and will thereby provide the air bubbles with a flow vector component in an upwards direction which will promote the movement of the air bubbles towards the second coolant outlet 45 even further.

In the embodiment illustrated in FIG. 1, the deaeration chamber 41 has an elongated shape and is arranged with its longitudinal axis 46 extending in vertical direction. In this case, the above-mentioned flow direction of the coolant in the deaeration chamber 41 is achieved by having the coolant inlet 43 located at a lower position than the first coolant outlet 44, which gives an upwardly directed coolant flow in the deaeration chamber 41. However, the deaeration chamber 41 may as an alternative be arranged with its longitudinal axis 46 inclined in relation to a horizontal plane by an angle α of 0-90°, e.g. by an angle α>0° and ⇐90°, or between 10-90°, or 15-90°. When the deaeration chamber 41 is arranged with its longitudinal axis 46 inclined, for instance in the manner illustrated in FIG. 2, air bubbles may rise in the deaeration chamber 41 and hit an inclined upper wall surface 47 in the deaeration chamber, whereupon the air bubbles are conveyed along this wall surface 47 towards the second coolant outlet 45 under the effect of the coolant flow in the deaeration chamber 41 between the coolant inlet 43 and the first coolant outlet 44.

One or more flow guiding members 48, 49 (see FIGS. 6 and 7) may be arranged in the deaeration chamber 41 downstream of the coolant inlet 43 and configured to direct the coolant entering the deaeration chamber 41 via the coolant inlet 43 essentially in parallel with the longitudinal axis 46 of the deaeration chamber. Such a flow guiding member may for instance have the form of a guide plate 46 or the similar arranged in front of the coolant inlet 43 in order to deflect the incoming coolant flow into a direction essentially in parallel with the longitudinal axis 46 of the deaeration chamber 41, as illustrated in FIG. 6. The flow guiding member may as an alternative have the form of a perforated plate 49 or the similar arranged across the deaeration chamber 41, as illustrated in FIG. 7.

Figure 3:
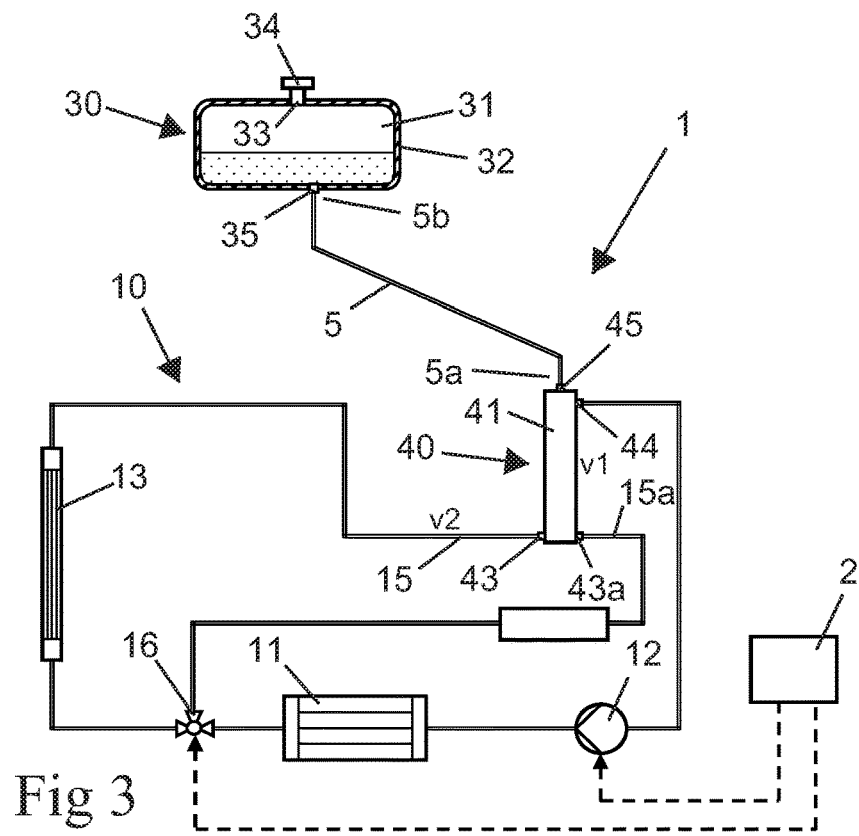
FIG. 3 is an outline diagram of a cooling system according to a third embodiment of the invention.

In the embodiment illustrated in FIG. 3, the cooling system 1 comprises a deaeration device 40 with a deaeration chamber 41 having a coolant inlet 43 and first and second coolant outlets 44, 45 arranged in the manner described above with reference to FIG. 1, wherein said coolant inlet 43 is connected to a first feed pipe 15 of the cooling circuit 10. In this case, the deaeration chamber 41 also comprises a further coolant inlet 43a connected to an associated second feed pipe 15a of the cooling circuit 10 in order to allow coolant circulating in the cooling circuit to flow from this second feed pipe 15a into the deaeration chamber 41 via the associated further coolant inlet 43a. In the illustrated example, the cooling circuit 10 comprises a valve device 16 for controlling the coolant flow towards the first and second feed pipes 15, 15a.

The cross-sectional dimension of the deaeration chamber 41 is larger than the cross-sectional dimension of the first feed pipe 15 to thereby allow air bubbles carried along with coolant flowing through the first feed pipe 15 to enter the deaeration chamber 41 via the associated coolant inlet 43 and thereafter migrate in the deaeration chamber 41 to the second coolant outlet 45. The cross-sectional dimension of the deaeration chamber 41 is preferably so much larger than the cross-sectional dimension of the first feed pipe 15 that the relationship between the flow velocity v1 of the coolant flowing through the deaeration chamber 41 between the coolant inlet 43 and the first coolant outlet 44 and the flow velocity v2 of the coolant flowing through the first feed pipe 15 is 1:2 or lower, preferably 1:3 or lower, when the valve device 16 directs the entire coolant flow in the cooling circuit 10 to the first fee pipe 15. In this case, the electronic control unit 2 may be configured to control the valve device 16 to direct the entire coolant flow in the cooling circuit 10 to the first fee pipe 15 when the coolant in the cooling circuit 10 is to be subjected to an efficient deaeration in the deaeration chamber 41.

In the embodiment illustrated in FIG. 3, the cross-sectional dimension of the deaeration chamber 41 is also larger than the cross-sectional dimension of the second feed pipe 15a to thereby allow air bubbles carried along with coolant flowing through the second feed pipe 15a to enter the deaeration chamber 41 via the associated coolant inlet 43a and thereafter migrate in the deaeration chamber 41 to the second coolant outlet 45, wherein this coolant inlet 43a is located in such a position in relation to the first and second coolant outlets 44, 45 that the coolant flow in the deaeration chamber 41 between this coolant inlet 43a and the first coolant outlet 44 will move these migrating air bubbles in the longitudinal direction of the deaeration chamber 41 towards the second coolant outlet 45.

The first coolant outlet 44 is arranged at a higher position than the coolant inlet 43a relative to a local gravity vector gv when the cooling system is mounted to a vehicle and the vehicle is positioned in an upright use position on a horizontal surface. Thereby the coolant flow from the coolant inlet 43a will have a vector component which is opposite the local gravity vector gv and will thereby provide the air bubbles with a flow vector component in an upwards direction which will promote the movement of the air bubbles towards the second coolant outlet 45 even further.

Figure 4:
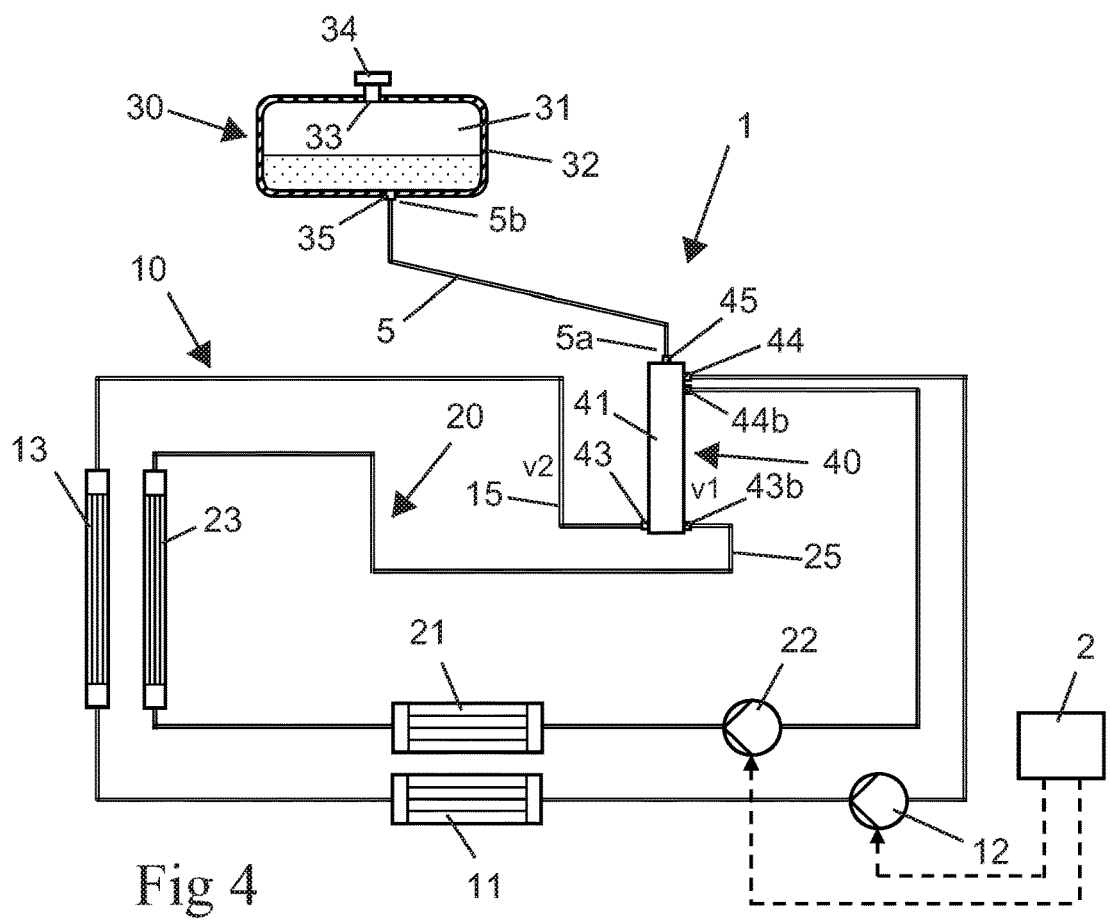
FIG. 4 is an outline diagram of a cooling system according to a fourth embodiment of the invention.

In the embodiment illustrated in FIG. 4, the cooling system 1 comprises a first cooling circuit 10 for cooling at least one first component 11 by means of coolant circulating in the first cooling circuit and a second cooling circuit 20 for cooling at least one second component 21 by means of coolant circulating in the second cooling circuit. A first coolant pump 12 is provided in the first cooling circuit 10 in order to circulate the coolant in the first cooling circuit 10 and a second coolant pump 22 is provided in the second cooling circuit 20 in order to circulate the coolant in the second cooling circuit 20. The first and second coolant pumps 12, 22 are preferably electrically driven pumps. An electronic control unit 2 is connected to the coolant pumps 12, 22 and configured to control the operation thereof so as to thereby control the flow velocities of the coolant circulating in the first and second cooling circuits 10, 20. A cooling device 13, 23, for instance in the form of a radiator or any other suitable type of heat exchanger, may be provided in each cooling circuit 10, 20 in order to remove heat from the coolant circulating therein.

In the embodiment illustrated in FIG. 4, the cooling system 1 comprises a deaeration device 40 with a deaeration chamber 41 having a coolant inlet 43 and first and second coolant outlets 44, 45 arranged in the manner described above with reference to FIG. 1, wherein the coolant inlet 43 is connected to a feed pipe 15 of the first cooling circuit 10 and the coolant outlet 44 is connected to the first coolant pump 12 in order to allow coolant circulating in the first cooling circuit 10 to flow from the feed pipe 15 into the deaeration chamber 41 via the coolant inlet 43 and allow coolant to flow from the deaeration chamber 41 to the first coolant pump 12 via the coolant outlet 44. In this case, the deaeration chamber 41 also comprises a further coolant inlet 43*b* connected to a feed pipe 25 of the second cooling circuit 20 and a further coolant outlet 44*b* connected to the second coolant pump 22 in order to allow coolant circulating in the second cooling circuit 20 to flow from the feed pipe 25 into the deaeration chamber 41 via said further coolant inlet 43*b* and allow coolant to flow from the deaeration chamber 41 to the second coolant pump 22 via said further coolant outlet 44*b*.

The cross-sectional dimension of the deaeration chamber 41 is larger than the cross-sectional dimension of the feed pipe 15 of the first cooling circuit 10 to thereby allow air bubbles carried along with coolant flowing through this feed pipe 15 to enter the deaeration chamber 41 via the associated coolant inlet 43 and thereafter migrate in the deaeration chamber 41 to the second coolant outlet 45. The cross-sectional dimension of the deaeration chamber 41 is preferably so much larger than the cross-sectional dimension of the feed pipe 15 of the first cooling circuit 10 that the relationship between the flow velocity v1 of the coolant flowing through the deaeration chamber 41 between the coolant inlet 43 and the first coolant outlet 44 and the flow velocity v2 of the coolant flowing through this feed pipe 15 is 1:2 or lower, preferably 1:3 or lower, in a situation when the first coolant pump 12 is in operation and the second coolant pump 22 is turned off.

In the embodiment illustrated in FIG. 4, the cross-sectional dimension of the deaeration chamber 41 is also larger than the cross-sectional dimension of the feed pipe 25 of the second cooling circuit 20 to thereby allow air bubbles carried along with coolant flowing through this feed pipe 25 to enter the deaeration chamber 41 via the associated further coolant inlet 43*b* and thereafter migrate in the deaeration chamber 41 to the second coolant outlet 45, wherein this further coolant inlet 43*b* is located in such a position in relation to the second coolant outlet 45 and said further coolant outlet 44*b* that the coolant flow in the deaeration chamber between this further coolant inlet 43*b* and said further coolant outlet 44*b* will move these migrating air bubbles in the longitudinal direction of the deaeration chamber 41 towards the second coolant outlet 45.

The further coolant outlet 44*b* is arranged at a higher position than the further coolant inlet 43*b* relative to a local gravity vector gv when the cooling system is mounted to a vehicle and the vehicle is positioned in an upright use position on a horizontal surface. Thereby the coolant flow from the coolant inlet 43*b* towards the coolant outlet 44*b* will have a vector component which is opposite the local gravity vector gv and will thereby provide the air bubbles with a flow vector component in an upwards direction which will promote the movement of the air bubbles towards the second coolant outlet 45 even further.

It is of course also possible to connect more than two cooling circuits to one and the same deaeration device 40 of the type described above.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A cooling system comprising:
a cooling circuit;
a coolant pump for circulating coolant in the cooling circuit;
an expansion tank for accumulation of coolant; and
a deaeration device arranged in the cooling circuit for separation of air bubbles from the coolant circulating in the cooling circuit, wherein the deaeration device is connected to the expansion tank via a static line and comprises a deaeration chamber comprising:
a coolant inlet connected to a feed pipe of the cooling circuit to allow coolant circulating in the cooling circuit to flow from the feed pipe into the deaeration chamber via the coolant inlet;
a first coolant outlet connected to the coolant pump to allow coolant to flow from the deaeration chamber to the coolant pump via the first coolant outlet, wherein the coolant inlet and the first coolant outlet are spaced apart from each other in a longitudinal direction of the deaeration chamber; and
a second coolant outlet connected to the expansion tank via the static line and located at a higher position than the first coolant outlet relative to a local gravity vector when the cooling system is mounted to a vehicle and the vehicle is positioned in an upright use position on a horizontal surface,
wherein a cross-sectional dimension of the deaeration chamber is larger than a cross-sectional dimension of the feed pipe to thereby allow air bubbles carried along with coolant flowing through the feed pipe to enter the deaeration chamber via the coolant inlet and thereafter migrate in the deaeration chamber to the second coolant outlet,
wherein the second coolant outlet is located in such a position in relation to the coolant inlet and the first coolant outlet that a coolant flow in the deaeration chamber between the coolant inlet and the first coolant outlet will move said migrating air bubbles in the longitudinal direction of the deaeration chamber towards the second coolant outlet, wherein the first coolant outlet is arranged at a higher position than the coolant inlet relative to the local gravity vector when the cooling system is mounted to the vehicle and the vehicle is positioned in the upright use position on the horizontal surface, and wherein the deaeration chamber has an elongated shape and is arranged with its longitudinal axis inclined in relation to a horizontal plane by an angle (a) that is in a range of one of: 0-90°; 10°-90°; or 15°-90°, when the cooling system is mounted to a vehicle and the vehicle is positioned in the upright use position.

2. A cooling system according to claim 1, wherein the cross-sectional dimension of the deaeration chamber is larger than the cross-sectional dimension of the feed pipe such that a relationship between a flow velocity of the coolant flowing through the deaeration chamber between the coolant inlet and the first coolant outlet and a flow velocity of the coolant flowing through the feed pipe is 1:2 or lower.

3. A cooling system according to claim 1, further comprising one or more flow guiding members arranged in the deaeration chamber downstream of the coolant inlet and configured to direct coolant entering the deaeration chamber via the coolant inlet.

4. A cooling system according to claim 1, further comprising a radiator for cooling of coolant circulating in the cooling circuit.

5. A cooling system according to claim 1, wherein the deaeration chamber comprises at least one further coolant inlet connected to an associated further feed pipe of the cooling circuit to allow coolant circulating in the cooling circuit to flow from the associated further feed pipe into the deaeration chamber via the further coolant inlet.

6. A cooling system according to claim 5, wherein the cross-sectional dimension of the deaeration chamber is larger than a cross-sectional dimension of said associated further feed pipe to thereby allow air bubbles carried along with coolant flowing through the associated further feed pipe to enter the deaeration chamber via the at least one further coolant inlet and thereafter migrate in the deaeration chamber to the second coolant outlet, wherein the at least one further coolant inlet is located in such a position in relation to the first coolant outlet and the second coolant outlet that coolant flow in the deaeration chamber between the at least one further coolant inlet and the first coolant outlet will move migrating air bubbles in the longitudinal direction of the deaeration chamber towards the second coolant outlet.

7. A cooling system according to claim 1, wherein:
said cooling circuit and coolant pump constitute a first cooling circuit and a first coolant pump of the cooling system,
the cooling system comprises a second cooling circuit and a second coolant pump for circulating coolant in the second cooling circuit, and
the deaeration chamber is provided with:
a further coolant inlet connected to a feed pipe of the second cooling circuit to allow coolant circulating in the second cooling circuit to flow from the feed pipe of the second cooling circuit into the deaeration chamber via this further coolant inlet; and
a further coolant outlet connected to the second coolant pump to allow coolant to flow from the deaeration chamber to the second coolant pump via this further coolant outlet.

8. A cooling system according to claim 7, wherein the cross-sectional dimension of the deaeration chamber is larger than a cross-sectional dimension of said feed pipe of the second cooling circuit to thereby allow air bubbles carried along with coolant flowing through this feed pipe to enter the deaeration chamber via the associated further coolant inlet and thereafter migrate in the deaeration chamber to the second coolant outlet, wherein this further coolant inlet is located in such a position in relation to the second coolant outlet and said further coolant outlet that the coolant flow in the deaeration chamber between the further coolant inlet and the further coolant outlet will move migrating air bubbles in the longitudinal direction of the deaeration chamber towards the second coolant outlet.

9. A cooling system according to claim 1, wherein the static line has a lower end and an upper end, wherein the static line is connected to the deaeration device at its lower end, and wherein at least one of:
the static line slopes upwards along its entire length from its lower end to its upper end; or
the static line is formed by several interconnected length sections which are arranged in series with each other and which consist of one or more first length sections, each of which sloping upwards as seen in a direction along the static line from its lower end towards its upper end, and one or more horizontal second length sections.

10. A cooling system according to claim 1, wherein the cross-sectional dimension of the deaeration chamber is larger than the cross-sectional dimension of the feed pipe such that a relationship between a flow velocity of the coolant flowing through the deaeration chamber between the coolant inlet and the first coolant outlet and a flow velocity of the coolant flowing through the feed pipe is 1:3 or lower.

11. A vehicle comprising a cooling system comprising:
a cooling circuit;
a coolant pump for circulating coolant in the cooling circuit;
an expansion tank for accumulation of coolant; and
a deaeration device arranged in the cooling circuit for separation of air bubbles from the coolant circulating in the cooling circuit, wherein the deaeration device is connected to the expansion tank via a static line and comprises a deaeration chamber comprising:
a coolant inlet connected to a feed pipe of the cooling circuit to allow coolant circulating in the cooling circuit to flow from the feed pipe into the deaeration chamber via the coolant inlet;
a first coolant outlet connected to the coolant pump to allow coolant to flow from the deaeration chamber to the coolant pump via the first coolant outlet, wherein the coolant inlet and the first coolant outlet are spaced apart from each other in a longitudinal direction of the deaeration chamber; and
a second coolant outlet connected to the expansion tank via the static line and located at a higher position than the first coolant outlet relative to a local gravity vector when the cooling system is mounted to a vehicle and the vehicle is positioned in an upright use position on a horizontal surface,
wherein a cross-sectional dimension of the deaeration chamber is larger than a
cross-sectional dimension of the feed pipe to thereby allow air bubbles carried along with coolant flowing through the feed pipe to enter the deaeration chamber via the coolant inlet and thereafter migrate in the deaeration chamber to the second coolant outlet,
wherein the second coolant outlet is located in such a position in relation to the coolant inlet and the first coolant outlet that a coolant flow in the deaeration chamber between the coolant inlet and the first coolant outlet will move said migrating air bubbles in the longitudinal direction of the deaeration chamber towards the second coolant outlet, wherein the first coolant outlet is arranged at a higher position than the coolant inlet relative to the local gravity vector when the cooling system is mounted to a vehicle and the vehicle is positioned in the upright use position on the horizontal surface, and wherein the deaeration chamber has an elongated shape and is arranged with its longitudinal axis inclined in relation to a horizontal plane by an angle (a) that is in a range of one of: 0-90°; 10°-90°; or 15°-90°, when the cooling system is mounted to a vehicle and the vehicle is positioned in the upright use position.

12. A cooling system according to claim 11, wherein the cross-sectional dimension of the deaeration chamber is larger than the cross-sectional dimension of the feed pipe such that a relationship between a flow velocity of the coolant flowing through the deaeration chamber between the coolant inlet and the first coolant outlet and a flow velocity of the coolant flowing through the feed pipe is 1:2 or lower.

13. A cooling system according to claim 11, further comprising one or more flow guiding members arranged in the deaeration chamber downstream of the coolant inlet and configured to direct coolant entering the deaeration chamber via the coolant inlet.

14. A cooling system according to claim 11, further comprising a radiator for cooling of coolant circulating in the cooling circuit.

15. A cooling system according to claim 11, wherein the deaeration chamber comprises at least one further coolant inlet connected to an associated further feed pipe of the cooling circuit to allow coolant circulating in the cooling circuit to flow from the associated further feed pipe into the deaeration chamber via the further coolant inlet.

16. A cooling system according to claim 15, wherein the cross-sectional dimension of the deaeration chamber is larger than a cross-sectional dimension of said associated further feed pipe to thereby allow air bubbles carried along with coolant flowing through the associated further feed pipe to enter the deaeration chamber via the at least one further coolant inlet and thereafter migrate in the deaeration chamber to the second coolant outlet, wherein the at least one further coolant inlet is located in such a position in relation to the first coolant outlet and the second coolant outlet that coolant flow in the deaeration chamber between the at least one further coolant inlet and the first coolant outlet will move migrating air bubbles in the longitudinal direction of the deaeration chamber towards the second coolant outlet.

* * * * *